Oct. 6, 1953 E. WANG 2,654,223
ROTARY HYDRAULIC COUPLING
Filed July 11, 1951 3 Sheets-Sheet 1

INVENTOR
EUGENE WANG
BY
HIS AGENT

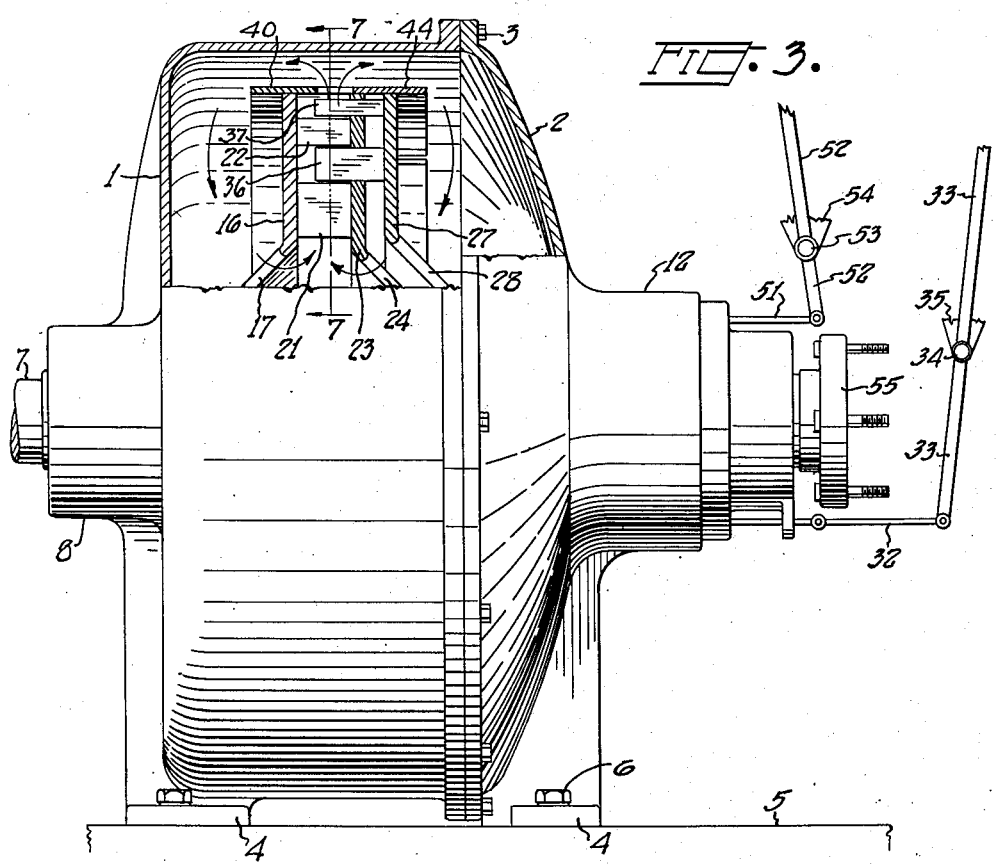
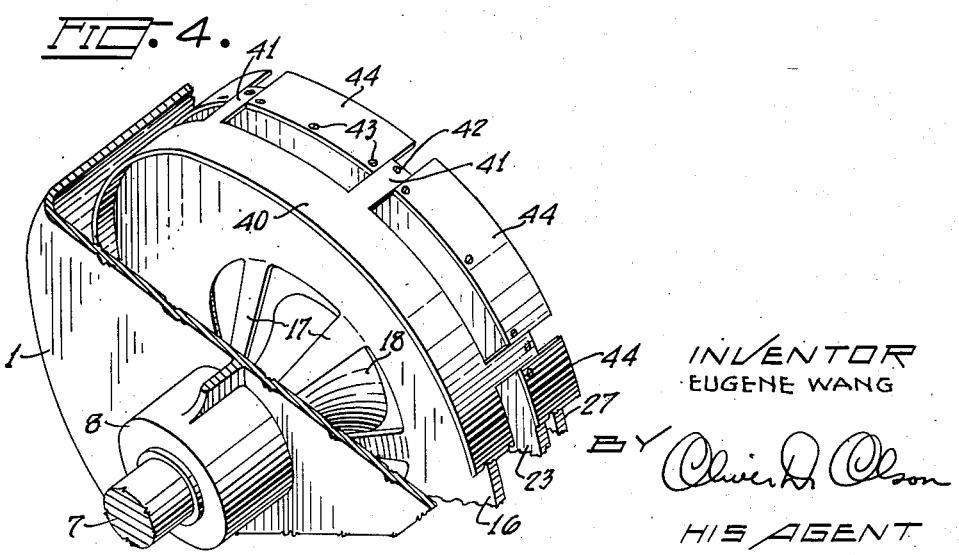

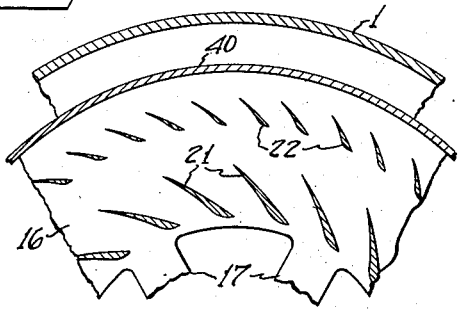
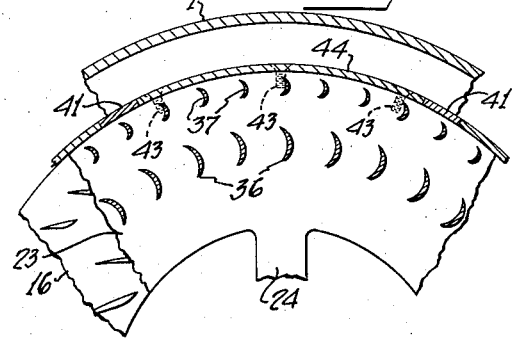
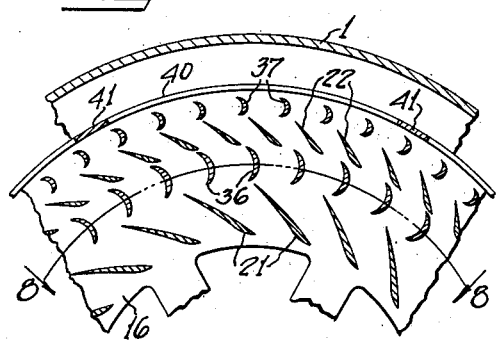
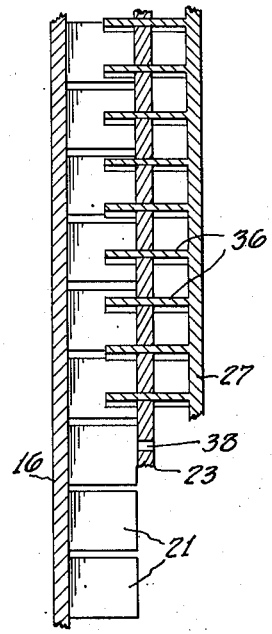
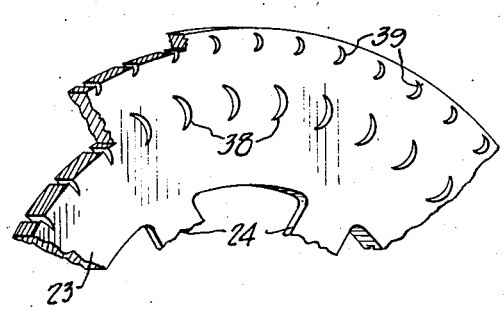
INVENTOR
EUGENE WANG

Patented Oct. 6, 1953

2,654,223

UNITED STATES PATENT OFFICE 2,654,223

ROTARY HYDRAULIC COUPLING

Eugene Wang, Portland, Oreg.

Application July 11, 1951, Serial No. 236,171

9 Claims. (Cl. 60—54)

This invention pertains to fluid couplings, and relates particularly to the novel construction of a fluid coupling by which to control the transmission of power from a drive member to a driven member with maximum efficiency.

The use of fluid couplings has been attended heretofore by two principal objections. The first resides in the inability to obtain complete disengagement between the drive and driven elements without incorporation of a mechanical clutch or other well-known means which provides for mechanical separation of the drive and driven elements. This incomplete disengagement is manifest, for example, in motor vehicles utilizing fluid couplings, in the tendency of the vehicle to "creep," or continue in motion while the engine is running, when it is desired that the vehicle remain stationary.

The second principal objection resides in the fact that substantial slippage occurs between the drive and driven elements. This slippage is manifest in the sluggishness with which the driven element reacts to acceleration, and is a result of the inefficient transfer of power from the drive vanes to the driven vanes.

It is a principal object of this invention, therefore, to provide a fluid coupling which overcomes the foregoing objections, i. e., to provide a fluid coupling in which substantially complete disengagement of the drive and driven elements is obtainable and in which slippage between said elements is reduced to a practical minimum.

Another important object of this invention is the provision of a fluid coupling which affords complete control of power transfer from the drive element to the driven element between the limits of complete disengagement and maximum power transfer.

A further object of the present invention is to provide a fluid coupling which is of simplified and therefore economical construction, and which is sturdily built for long and efficient operation.

These and other objects and advantages of the present invention will appear from the following detailed description taken in connection with the accompanying drawings, in which:

Figure 3 is a vertical elevation, partly in section, showing the fluid coupling arranged for partial fluid engagement of the drive and driven elements;

Figure 4 is a fragmentary perspective view of the coupling as viewed from the left in Figure 3, with parts broken away to disclose details of construction;

Figure 5 is a fragmentary sectional view taken along the line 5—5 in Figure 1;

Figure 6 is a fragmentary sectional view taken along the line 6—6 in Figure 1;

Figure 7 is a fragmentary sectional view taken along the line 7—7 in Figure 3;

Figure 8 is a sectional view taken along the arcuate line 8—8 in Figure 7; and

Figure 9 is a fragmentary perspective view of the guide plate showing the arrangement of openings adapted to receive the driven vanes slidably therethrough.

Figure 1:
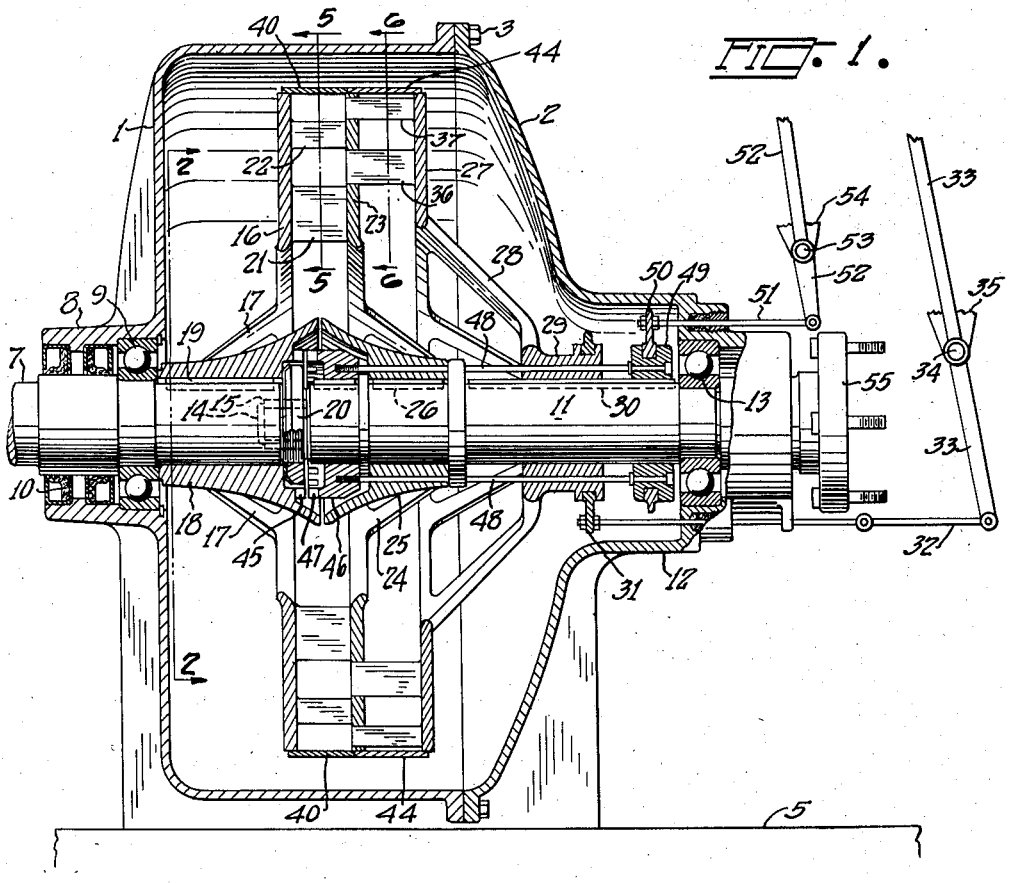
Figure 1 is a vertical sectional view of a fluid coupling embodying the features of this invention, with the parts being arranged for complete disengagement of the drive and driven elements.

Referring particularly to Figures 1 and 3 of the drawings, the fluid coupling of the present invention is shown contained within a stationary cylindrical housing formed of the main section 1 and the cap section 2 secured together by bolts 3. The base 4 of the housing may be secured to a support 5 by such means as bolts 6. A drive shaft 7 is mounted for axial rotation in the hub end 8 of the housing section 1 by means of bearing ring 9. Grease or oil retainers 10 are provided in accordance with well-established practice. The drive shaft is connected in any conventional manner to a drive motor (not shown).

A driven shaft 11 is mounted for axial rotation in the hub end 12 of the removable cap section 2 of the housing by means of bearing ring 13. The inner end of the driven shaft is reduced in diameter and is received for rotation within an axial bore 14 provided in the inner end of the drive shaft 7. The telescoping ends of said shafts are separated circumferentially by roller bearing 15, indicated in dotted lines in Figure 1.

A circular drive plate 16 is secured, by means of its circumferentially spaced spokes 17, to a hub 18 which is mounted upon drive shaft 7 and secured thereto by key 19. The hub is positioned between the bearing ring 9 and the collar 20, the latter of which is secured removably to the threaded reduced end of the drive shaft, as shown. The spaced spokes 17 of drive plate 16 provide a plurality of fluid entrance ports arranged in spaced circumferential relation adjacent the hub 18. The function of the entrance ports is described in detail hereinafter.

Projecting inwardly from the drive plate 16 radially outward from the entrance ports are a plurality of circumferentially spaced drive vanes 21. These vanes are preferably of rather elongated cross section, as shown in Figure 5, and extend obliquely outward in a direction opposite the direction of rotation of the plate 16. In Figures 5, 6 and 7 the plate 16 rotates in a clockwise direction. A second group of drive vanes 22 are spaced radially outward from the first group of vanes 21. The vanes 22 project inwardly from the drive plate 16 and are arranged in the oblique manner of vanes 21. As shown in Figures 5 and 7 of the drawings, the vanes 22 preferably are of shorter cross sectional length than vanes 21.

A guide plate 23 is secured by spokes 24 to a hub 25 which is keyed to the driven shaft 11 by key 26, in the manner of the drive plate already described. Since the hubs 18 and 25 are secured firmly to the drive and driven shafts, respectively, the drive and guide plates are thereby positioned in fixed spaced relation with each other, said spacing being slightly greater than the length of the drive vanes 21 and 22.

A driven plate 27 is secured by spokes 28 to a hub 29 which is mounted slidably upon the driven shaft 11 rearwardly of hub 25. A key 30 secures the hub 29 against rotation on the driven shaft but permits longitudinal movement of the hub on said shaft. A slip ring 31 mounted freely in a circumferential groove in hub 29 is connected pivotally by rod 32 to the actuating lever 33 which is pivoted intermediate its ends by pin 34 supported by a mounting bracket 35. Actuation of the lever 33 causes the driven plate 27 to be moved relative to the guide plate 23, as shown by comparing Figures 1 and 3, and described in detail hereinafter.

Mounted upon the driven plate 27 and projecting inwardly therefrom toward the guide plate 23 are a plurality of driven vanes 36 arranged in circumferentially spaced relation and positioned on a radius from the axis of the drive and driven shafts which is intermediate the positions of the radially spaced drive vanes 21, 22. A second set of circumferentially spaced driven vanes 37 extend from the driven plate toward the guide plate from a radius greater than that of drive vanes 22.

The driven vanes 36 and 37 are of arcuate cross section, as shown in Figures 6 and 7, and extend through complementary openings 38 and 39, respectively, formed in the guide plate 23, as best shown in Figure 9. These openings are of identical configuration as the cross sectional shape of the respective driven vanes, and are of slightly greater dimension to permit a close but sliding fit for the vanes. Thus, as the driven plate 27 is moved toward the guide plate 23, the driven vanes are projected into the space between the drive plate 16 and said guide plate, the driven vanes 36 occupying the space between the drive vanes 21 and 22 while the driven vanes 37 extend radially outward from drive vanes 22, as previously explained.

A circular sleeve 40, having an inner diameter substantially equal to the diameter of the drive plate 16, encompasses the latter freely and is secured by the spaced extensions 41 and screws 42 to the circumferential edge of the driven plate 27. The width of the sleeve is slightly greater than the width of the space between the drive plate 16 and guide plate 23. Thus, referring to Figures 1 and 2 of the drawings, the sleeve is capable of sealing said space when the driven plate 27 is fully retracted, as shown. The sleeve functions as a fluid valve in the manner described in detail hereinafter.

Figure 2:
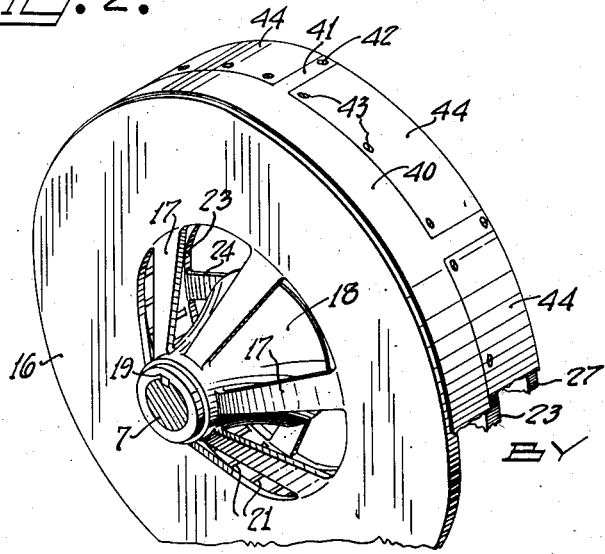
Figure 2 is a fragmentary perspective view taken along the line 2—2 in Figure 1.

Secured to the circumferential edge of guide plate 23 by the screws 43 are a plurality of arcuate plates 44. Each of these plates is positioned between adjacent extensions 41 of the sleeve 40 and project rearwardly over the circumferential edge of the driven plate 27. The plates 44 are of sufficient width to extend and enclose the space between the guide plate 23 and the driven plate 27 when the latter is fully retracted, as shown in Figures 1 and 2.

In Figure 1 of the drawings there is illustrated conventional means by which the drive shaft 7 and driven shaft 11 may be coupled together mechanically. The inner end of the drive plate hub 18 is recessed and provided with circumferentially spaced gear teeth 45. The guide plate hub 25 is similarly recessed to receive a cylindrical block 46 having gear teeth 47 formed thereon for cooperative registration with the gear teeth 45. Rods 48 are secured at one end to block 46 and extend slidably through holes in the hubs 25 and 29 for attachment to a collar 49. The collar 49 and block 46 are secured against relative rotation with the driven shaft 11 by key means 30. A slip ring 50 is slidably retained in a circumferential groove in the collar and is connected pivotally by rod 51 to one end of the actuating lever 52. The lever is mounted pivotally intermediate its ends on pin 53 secured to the mounting bracket 54.

It is apparent that the drive shaft 7 is to be connected to a source of power, such as an internal combustion engine. The driven shaft 11 is connected, as by the coupling plate 55, to the device (not shown) which is to be driven. For example, the drive shaft 7 may constitute or be connected to the crank shaft of an automobile engine and the driven shaft 11 may be connected, either directly or through a transmission, to the drive shaft of the automobile.

The operation of the fluid coupling of the present invention is as follows: Let it be assumed, for purposes of illustration, that the drive shaft 7 is connected to a source of power being operated at its rated efficient constant speed. It is also to be assumed that the interior of the housing 1, 2 is completely filled with a fluid, such as oil.

Referring to Figure 1 of the drawings, it is seen that the driven plate 27 is fully retracted and that the free ends of the driven vanes 36, 37 are flush with the inner surface of the guide plate 23. In this position the sleeve valve 40 completely seals the space between the drive plate 16 and the guide plate 23. Thus, although the drive vanes 21, 22 are being rotated by the drive shaft 7, the fluid cannot pass radially outward through said space, but must merely travel in the circular path of the drive vanes. Since the driven vanes 36, 37 are fully retracted, the fluid in the space between the drive plate 16 and guide plate 23 does not exert a pressure thereon and, accordingly, the driven shaft 11 remains idle.

The arcuate plates 44 function with the extensions 41 as a shroud to close the space between the guide plate 23 and the driven plate 27. In this manner the fluid in said space is prevented from moving obliquely outward past the driven vanes. Accordingly, the fluid in said space is prevented from exerting any pressure upon the driven vanes sufficient to induce rotation of the driven plate 27.

Assume now that the operator moves the lever 33 to the position shown in Figure 3. In this position the driven plate 27 has been moved toward the guide plate 23 and the driven vanes 36, 37 have been projected a portion of their length into the space between the drive plate 16 and guide plate 23. Simultaneously, the sleeve valve 40 has been moved to the left a distance equal to the length of driven vanes now extending into the path of the drive vanes 21, 22. A circumferential fluid outlet opening is thus provided between the sleeve 40 and the arcuate plates 44 for the passage of fluid.

Under the influence of the rotating drive vanes 21, 22 the fluid is forced, by centrifugal action, obliquely outward from drive vanes 21 to impinge upon driven vanes 36, and thence from drive vanes 22 into impingement upon driven vanes 37. The fluid must impinge upon the driven vanes because of the restriction of the opening provided by the sleeve valve 40. In this manner most efficient utilization of the fluid pressure and velocity generated by the drive vanes is obtained.

It is apparent that the degree of fluid coupling between the drive and driven vanes, and hence the degree of power transfer, is variable within the movable limits of the driven vanes. Maximum efficiency of power transfer is obtained for each controlled degree of transfer by virtue of the provision of the sleeve valve 40.

The fluid passes from the circumferential opening between the sleeve 40 and arcuate plates 44 and is diverted laterally in the directions indicated by the arrows in Figure 3. Since the fluid in the space between the housing sections 1, 2 and the plates 16 and 27 is not subjected to any centrifugal forces such as occurs in the path of the drive vanes, the fluid is free to travel in substantially circular paths, as indicated by the arrows, from the peripheral opening laterally outward and then radially inward to the intake openings provided between the spokes 17, 24 and 28.

In the foregoing manner the fluid is subjected to centrifugal action only in the space occupied by the drive and driven vanes between the plates 16 and 23. When expelled from this space there are no forces opposing the return of the fluid to the intake openings. Efficient circulation of fluid is thereby obtained, and excessive heating of the fluid is obviated. The normal heat developed in the working space of the vanes is readily dissipated through the housing sections 1, 2 as the fluid is returned to the intake openings.

The fluid coupling is adapted in many sizes and designs for use with various types of equipment as, for example, locomotives, marine engines, automobiles, and many other stationary or mobile equipment. For automotive use, for example, the coupling may be used in conjunction with conventional transmissions of the manual or automatic types.

It will be apparent to those skilled in the art that various changes in the structural details described hereinbefore may be made without departing from the scope and spirit of the present invention. For example, the shape, number and position of the drive and driven vanes and the number of stages of vanes may be varied in accordance with well-known mechanical principles. The control of the driven plate 27 may be accomplished by automatic means rather than by the manual operation of lever 33. The sleeve valve 40 may be secured to the free ends of the driven vanes 37, rather than to plate 27, and a cylindrical shroud secured to housing section 1 may replace the arcuate plates 44 and extensions 41.

The fluid coupling illustrated and described herein is adapted, by the base 4, for a stationary installation. It is apparent, however, that the housing sections 1, 2 may be supported solely by the drive and driven shafts and thus be permitted either to rotate freely about both of said shafts or to be secured to one of said shafts for rotation therewith. In any of these latter constructions it is necessary only that an additional collar and slip ring be provided externally of the housing for connection of the control rods 32 and 51, as will be apparent to those skilled in the art. The above and many other modifications may be made, as desired. Accordingly, it is to be understood that the foregoing detailed description is merely illustrative of the invention and is not to be considered in a limiting sense.

Having now described my invention and the manner in which the same may be used, what I claim as new and desire to secure by Letters Patent is:

1. A fluid coupling comprising a hollow housing, a pair of shafts extending coaxially through the housing for independent rotation, a plate mounted for rotation with one of said shafts, a second plate mounted for rotation with the second shaft and movable longitudinally with respect thereto, a third plate mounted intermediate the first and second plates for rotation with said second shaft, the said plates being coaxially aligned and extending radially around their respective shafts and each having fluid openings therein adjacent the shafts, vanes on the first plate extending toward the third plate, and vanes on the second plate displaced radially from said first vanes and extending slidably through complementary openings in the third plate for adjustable coplanar registration with said first vanes, the vanes on the second plate being of uniform cross section corresponding to the openings in the third plate for closing the openings in the third plate in all adjusted positions of said vanes.

2. A fluid coupling comprising a hollow housing, a pair of shafts extending coaxially through the housing for independent rotation, a plate mounted for rotation with one of said shafts, a second plate mounted for rotation with the second shaft and movable longitudinally with respect thereto, a third plate mounted intermediate the first and second plates for rotation with said second shaft, the said plates being coaxially aligned and extending radially around their respective shafts and each having fluid openings therein adjacent the shafts, vanes on the first plate extending toward the third plate, vanes on the second plate displaced radially from said first vanes and extending slidably through complementary openings in the third plate for adjustable coplanar registration with said first vanes, and sleeve valve means operated by the second plate and positioned to retractably enclose the peripheral space between the first and third plates.

3. A fluid coupling comprising a hollow housing, a pair of shafts extending coaxially through the housing for independent rotation, a plate mounted for rotation with one of said shafts, a second plate mounted for rotation with the second shaft and movable longitudinally with respect thereto, a third plate mounted intermediate the first and second plates for rotation with said second shaft, the said plates being coaxially aligned and extending radially around their respective shafts and each having fluid openings therein adjacent the shafts, vanes on the first plate extending toward the third plate, vanes on the second plate displaced radially from said first vanes and extending slidably through complementary openings in the third plate for adjustable coplanar registration with said first vanes, the vanes on the second plate closing the openings in the third plate in all adjusted positions of said vanes, and sleeve valve means operated by the second plate and positioned to retractably enclose the peripheral space between the first and third plates.

4. The fluid coupling of claim 3 wherein the first said shaft is a drive shaft and the second shaft is a driven shaft.

5. The fluid coupling of claim 3 wherein the sleeve valve means is positioned to open the peripheral space between the first and third plates a distance substantially equal to the length of the portion of the second plate vanes registering with the first plate vanes.

6. A fluid coupling comprising a hollow housing, a pair of shafts extending coaxially through the housing for independent rotation, a plate mounted for rotation with one of said shafts, a second plate mounted for rotation with the second shaft and movable longitudinally with respect thereto, a third plate mounted intermediate the first and second plates for rotation with said second shaft, the said plates being coaxially aligned and extending radially around their respective shafts and each having fluid openings therein adjacent the shafts, vanes on the first plate extending toward the third plate, vanes on the second plate displaced radially from said first vanes and extending slidably through complementary openings in the third plate for adjustable coplanar registration with said first vanes, and shroud means secured relative to the third plate and enclosing the peripheral space between the second and third plates.

7. A fluid coupling comprising a hollow housing, a pair of shafts extending coaxially through the housing for independent rotation, a plate mounted for rotation with one of said shafts, a second plate mounted for rotation with the second shaft and movable longitudinally with respect thereto, a third plate mounted intermediate the first and second plates for rotation with said second shaft, the said plates being coaxially aligned and extending radially around their respective shafts and each having fluid openings therein adjacent the shafts, vanes on the first plate extending toward the third plate, vanes on the second plate displaced radially from said first vanes and extending slidably through complementary openings in the third plate for adjustable coplanar registration with said first vanes, sleeve valve means operated by the second plate and positioned to retractably enclose the peripheral space between the first and third plates, and shroud means secured relative to the third plate and enclosing the peripheral space between the second and third plates.

8. The fluid coupling of claim 7 wherein the shroud means comprises arcuate plates secured to the third plate.

9. A fluid coupling comprising a hollow housing, a pair of shafts extending coaxially through the housing for independent rotation, a plate mounted for rotation with one of said shafts, a second plate mounted for rotation with the second shaft and movable longitudinally with respect thereto, a third plate mounted intermediate the first and second plates for rotation with said second shaft, the said plates being coaxially aligned and extending radially around their respective shafts and each having fluid openings therein adjacent the shafts, vanes on the first plate extending toward the third plate, vanes on the second plate displaced radially from said first vanes and extending slidably through complementary openings in the third plate for adjustable coplanar registration with said first vanes, the vanes on the second plate closing the openings in the third plate in all adjusted positions of said vanes, sleeve valve means operated by the second plate and positioned to retractably enclose the peripheral space between the first and third plates, and shroud means secured relative to the third plate and enclosing the peripheral space between the second and third plates.

EUGENE WANG.

References Cited in the file of this patent

UNITED STATES PATENTS

| Number | Name | Date |
|---|---|---|
| 1,428,586 | Garrison | Sept. 12, 1922 |
| 2,258,302 | Ronning | Oct. 7, 1941 |
| 2,266,085 | Sanderson | Dec. 16, 1941 |
| 2,270,545 | Neracher et al. | Jan. 20, 1942 |
| 2,384,841 | Lang et al. | Sept. 18, 1945 |